US011375573B2

(12) United States Patent
Yang

(10) Patent No.: US 11,375,573 B2
(45) Date of Patent: *Jun. 28, 2022

(54) DATA TRANSMISSION METHOD AND APPARATUS FOR DISCONTINUOUS RECEPTION

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 99 days.

This patent is subject to a terminal disclaimer.

(21) Appl. No.: 17/110,918

(22) Filed: Dec. 3, 2020

(65) Prior Publication Data

US 2021/0092795 A1 Mar. 25, 2021

Related U.S. Application Data

(63) Continuation of application No. 16/447,770, filed on Jun. 20, 2019, now Pat. No. 10,952,277, which is a
(Continued)

(51) Int. Cl.
*H04W 76/28* (2018.01)
*H04B 17/318* (2015.01)
(Continued)

(52) U.S. Cl.
CPC .......... *H04W 76/28* (2018.02); *H04B 17/318* (2015.01); *H04W 24/10* (2013.01); *H04W 72/042* (2013.01); *H04W 72/046* (2013.01)

(58) Field of Classification Search
CPC ..... H04B 7/088; H04B 17/318; H04W 74/08; H04W 72/042; H04W 76/28; H04W 72/046; H04W 24/10
See application file for complete search history.

(56) References Cited

U.S. PATENT DOCUMENTS

2009/0023451 A1   1/2009 Pan et al.
2011/0019776 A1   1/2011 Zhang et al.
(Continued)

FOREIGN PATENT DOCUMENTS

JP   2015530018 A   10/2015
WO   2014187322 A1   11/2014
(Continued)

OTHER PUBLICATIONS

The first Office Action of corresponding Taiwan application No. 106142298, dated May 21, 2021.
(Continued)

*Primary Examiner* — Syed Ali
(74) *Attorney, Agent, or Firm* — Ladas & Parry, LLP

(57) ABSTRACT

Embodiments of the present application provides signal transmission method and apparatus for discontinuous reception, the signal transmission method includes: measuring, by a terminal device, a signal received by each of at least one downlink receiving beam and transmitted by a network device, where the number of the at least one downlink receiving beam is less than the number of downlink receiving beams formed by the terminal device and the network device by means of beamforming; determining, by the terminal device, a target downlink receiving beam from the at least one downlink receiving beam according to a result of the measurement; reporting, by the terminal device, the target downlink receiving beam to the network device, and receiving, by the terminal device, through the target downlink receiving beam, a physical downlink control channel PDCCH transmitted by the network device.

16 Claims, 3 Drawing Sheets

Related U.S. Application Data continuation of application No. PCT/CN2016/111579, filed on Dec. 22, 2016.

(51) Int. Cl.
*H04W 24/10* (2009.01)
*H04W 72/04* (2009.01)

(56) References Cited

U.S. PATENT DOCUMENTS

| | | | |
|---|---|---|---|
| 2011/0211595 | A1 | 9/2011 | Geirhofer et al. |
| 2011/0222485 | A1 | 9/2011 | Nangia et al. |
| 2011/0249633 | A1 | 10/2011 | Hong et al. |
| 2013/0331081 | A1 | 12/2013 | Rune et al. |
| 2015/0078189 | A1 | 3/2015 | Kwon et al. |
| 2015/0079989 | A1* | 3/2015 | Tambaram Kailasam .................. H04W 36/0088 455/436 |
| 2015/0092554 | A1* | 4/2015 | Mochizuki ............ H04W 76/27 370/252 |
| 2016/0219475 | A1* | 7/2016 | Kim ...................... H04W 76/28 |
| 2016/0323823 | A1* | 11/2016 | Ryoo ................. H04W 52/0216 |
| 2017/0013575 | A1* | 1/2017 | Jung ........................ H04L 47/29 |
| 2017/0013595 | A1* | 1/2017 | Jung ...................... H04W 8/005 |
| 2017/0250786 | A1* | 8/2017 | Better ................... H04W 76/28 |
| 2017/0332287 | A1* | 11/2017 | Sethi ................. H04W 36/0022 |
| 2018/0317113 | A1* | 11/2018 | Kim ...................... H04W 24/08 |

FOREIGN PATENT DOCUMENTS

| | | |
|---|---|---|
| WO | 2016041358 A1 | 3/2016 |
| WO | 2017066917 A1 | 4/2017 |

OTHER PUBLICATIONS

The EESR of corresponding European application No. 21166047.7, dated Jul. 5, 2021.
The first Office Action of corresponding Japanese application No. 2019-534730, dated Jan. 5, 2021.
The first Office Action of corresponding Indian application No. 201917028701, dated Jan. 15, 2021.
"Performance analysis of DRX mechanism considering analogue beamforming in millimeter-wave mobile broadband system", Publication data:2014 IEEE Globecom Workshops (GC Wkshps), Dec. 8, 2014 IEEE, workshop on Dec. 8, 2014.
The Decision of Rejection of corresponding Taiwan application No. 106142293, dated Nov. 30, 2021.
The international search report of PCT application No. PCT/CN2016/111579, dated Sep. 30, 2017.
Extended European Search Report dated Nov. 20, 2019; Application No. 16924854.9.
The first Office Action of the parallel EP application No. 16924854.9, dated Jul. 2, 2020.
The Notice of allowance of the corresponding U.S. Appl. No. 16/447,770, dated Sep. 2, 2020.
Kwon Sang-Wook et al:"Performance analysis of DRX mechanism considering analogue beamforming in millimeter-wave mobile broadband system", 2014 IEEE Globecom Workshops; Dec. 8, 2014 (Dec. 8, 2014) XP032747774, entire document.
Nokia Alcatel-Lucent Shanghai Bell:"RRM Requirements supporting NR beam management"; 3GPP; Mobile Competence Centre; 650, Route Des Lucioles; F-06921 Sophia-Antipolis Cedex; France, vol. RAN WG4, No. Reno, USA; Nov. 14, 2016-Nov. 18, 2016; Nov. 14, 2016; XP051180431, entire document.
Samsung: "NR Connected DRX Operation with Beamforming", R2-168816 (3GPP); Mobile Competence Centre; 650, Route Des Lucioles; F-06921 Sophia-Antipolis Cedex; Fran; vol. RAN WG2, No. Reno, USA; Nov. 14, 2016-Nov. 18, 2016; Nov. 14, 2016, XP051178384, entire document.
Catt:"Connected state mobility measurements", R2-167963 (3GPP); Mobile Competence Centre; 650, Route Des Lucioles; F-06921 Sophia-Antipolis Cedex; Fran; vol. Ran WG2, No. Reno, USA; Nov. 14, 2016-Nov. 18, 2016; Nov. 2016; XP051177691, entire document.
Written Opinion of the International Searching Authority in the international application No. PCT/CN2016/111579, dated Sep. 30, 2017.
International Preliminary Report on Patentability issued for International Application No. PCT/CN2016/111579 dated Jun. 25, 2019.

* cited by examiner

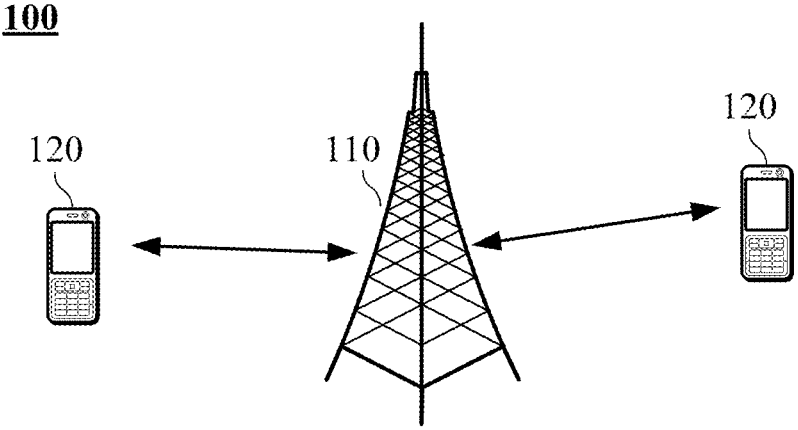

| a terminal device measures a first signal received by each of at least one downlink receiving beam and transmitted by a network device, where a number of the at least one downlink receiving beam is less than a number of downlink receiving beams formed by the terminal device and the network device by means of beamforming | ~S210 |

| the terminal device determines a target downlink receiving beam from the at least one downlink receiving beam according to a result of the measurement | ~S220 |

| the terminal device reports the target downlink receiving beam to the network device | ~S230 |

| the terminal device receives, through the target downlink receiving beam, a physical downlink control channel PDCCH transmitted by the network device | ~S240 |

FIG. 2

300 a network device transmits a first signal for measurement and indication information to a terminal device, the indication information is configured to instruct the terminal device to determine a target downlink receiving beam from at least one downlink receiving beam by measuring the first signal, where the number of the at least one downlink receiving beam is less than the number of downlink receiving beams formed by the network device and the terminal device by means of beamforming ~S310 the network device receives the target downlink receiving beam reported by the terminal device according to the first signal and the indication information ~S320 the network device transmits a physical downlink control channel PDCCH to the terminal device through the target downlink receiving beam ~S330

FIG. 3

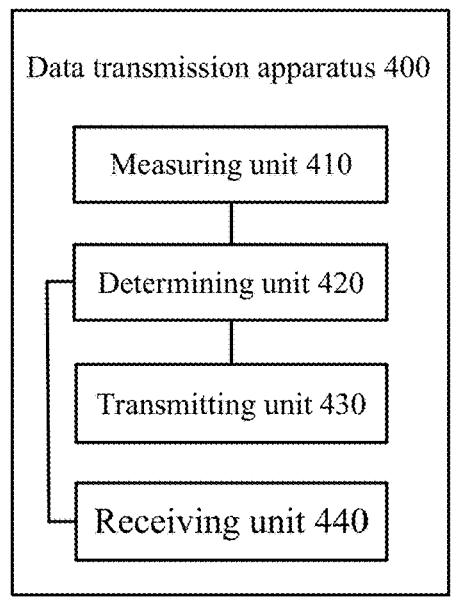

FIG. 4

DATA TRANSMISSION METHOD AND APPARATUS FOR DISCONTINUOUS RECEPTION

CROSS-REFERENCE TO RELATED APPLICATIONS

This application is a continuation of U.S. patent application Ser. No. 16/447,770, filed on Jun. 20, 2019, which is a continuation of International Application No. PCT/CN2016/111579 filed on Dec. 22, 2016. All of the aforementioned patent applications are hereby incorporated by reference in their entireties.

TECHNICAL FIELD

The present application relates to the field of communication, and more particularly, to data transmission method and apparatus for discontinuous reception (Discontinuous Reception, "DRX" for short) in the field of communication.

BACKGROUND

In order to reduce a state transition cost in a service mode change, an intermediate state, i.e. active discontinuous reception (Active DRX) mechanism, is introduced into Long Term Evolution (LTE). The Active DRX mechanism allows the terminal device to periodically transform between a sleep state and an activation state while maintaining a Radio Resource Control (RRC) connection. The Active DRX mechanism divides a connection state of the terminal device into an activation state phase and a sleep state phase. The system resource configuration can be optimized by causing the terminal device to periodically enter a sleep period and stop monitoring a physical downlink control channel (PDCCH). In addition, because the RRC connection still exists in this state, the terminal device is enabled to turn to the activation state very quickly.

In a 5G multi-beam system, the terminal device and a network device may train multiple downlink receiving beams by means of beamforming, and different downlink receiving beams may transmit signals over different time resources. However, as a location of the terminal device changes, it may result a mismatch between downlink transmission beam and downlink receiving beam, which means the currently used downlink receiving beam cannot receive the signal transmitted by the downlink transmitting beam matched with the network device before a movement.

For an existing DRX technology, when the terminal device enters the activation state of the Active DRX, firstly, the terminal device needs to measure a signal received by each of the trained downlink receiving beams and transmitted by the network device, and treat a downlink receiving beam with best signal strength as a downlink receiving beam used for downlink transmission, so that the terminal device can receive and decode the PDCCH during the activation state of the Active DRX.

However, if the number of the downlink receiving beams of the terminal device is relative large, the terminal device may waste a large amount of time due to beam selection during the activation state of the Active DRX, causing the terminal device to have no time to decode the PDCCH during the activation state.

SUMMARY

The signal transmission method and apparatus for discontinuous reception provided by embodiments of the present application can reduce a time required for a terminal device to select a downlink receiving beam, so that the terminal device can successfully receive and decode the PDCCH transmitted by the network device during the activation state of the Active DRX.

In a first aspect, the present application provides a data transmission method for discontinuous reception, where the data transmission method includes:

measuring, by a terminal device, a first signal received by each of at least one downlink receiving beam and transmitted by a network device;

determining, by the terminal device, a target downlink receiving beam from the at least one downlink receiving beam according to a result of the measurement;

reporting, by the terminal device, the target downlink receiving beam to the network device, and receiving, by the terminal device, through the target downlink receiving beam, a physical downlink control channel PDCCH transmitted by the network device.

In an embodiment, a number of the at least one downlink receiving beam may be less than a number of downlink receiving beams formed by the terminal device and the network device by means of beamforming.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In the data transmission method for discontinuous reception provided by the present application, the terminal device measures the first signal received by each of the at least one downlink receiving beam and transmitted by the network device, where the number of the at least one downlink receiving beam is less than the number of the downlink receiving beams formed by the terminal device and the network device by means of beamforming, which can reduce a time required for the terminal device to select the downlink receiving beam.

It should be understood that the downlink receiving beam of the terminal device in the embodiment of the present application may also be a downlink receiving signal or a downlink channel, which is not limited in the embodiments of the present application.

In the embodiment of the present application, the measuring, by a terminal device, a first signal received by each of at least one downlink receiving beam and transmitted by a network device may be measuring a signal strength or a signal quality of the first signal received by the downlink receiving beam, which is not limited by the embodiments of the present application.

In combination with the first aspect, in a first possible implementation of the first aspect, before the measuring, by a terminal device, a first signal received by each of at least one downlink receiving beam and transmitted by a network device, the method further includes: determining, by the terminal device, the at least one downlink receiving beam.

Specifically, the terminal device may select at least one downlink receiving beam from downlink receiving beams formed by the terminal device and the network device by means of beamforming, and measure the first signal received by each of the at least one downlink receiving beam and transmitted by the network device.

In an embodiment, the terminal device may determine downlink receiving beams in different directions in spatial as the at least one downlink receiving beam.

In an embodiment, the terminal device may determine the at least one downlink receiving beam by itself, or may determine the at least one downlink receiving beam according to an indication of the network device, which is not limited in the embodiments of the present application.

The data transmission method for discontinuous reception provided by the present application, through performing measurement on a part of downlink receiving beam selected from a plurality of downlink receiving beams formed by the terminal device and the network device by means of beamforming, reduces the number of the downlink receiving beam required to be measured by the terminal device, reduces the time required for the terminal device to perform beam selection, and ensuring that the terminal device can successfully receive and decode the PDCCH transmitted by the network device during the activation state of the Active DRX.

In combination with the first possible implementation of the first aspect, in a second possible implementation of the first aspect, the determining, by the terminal device, the at least one downlink receiving beam includes: receiving, by the terminal device, first indication information transmitted by the network device, where the first indication information is configured to indicate the number of the at least one downlink receiving beam, and the number of the at least one downlink receiving beam is less than the number of the downlink receiving beams formed by the terminal device and the network device by means of beamforming; and determining, by the network device, the at least one downlink receiving beam according to the number of the at least one downlink receiving beam.

Specifically, the terminal device may determine the at least one downlink receiving beam according to an indication of the network device.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In an embodiment, the terminal device may receive first indication information transmitted by the network device, where the first indication information is configured to indicate the number of the at least one downlink receiving beam, and the terminal device may determine the at least one downlink receiving beam according to the number of the at least one downlink receiving beam.

In an embodiment, the terminal device may determine at least one downlink receiving beam in different directions in spatial as the at least one downlink receiving beam.

In combination with the first aspect, in a third possible implementation of the first aspect, before the measuring, by a terminal device, a first signal received by each of at least one downlink receiving beam and transmitted by a network device, the method further includes: determining, by the terminal device, a first measurement timer, where a length of the first measurement timer is less than a duration in which the terminal device is in an activation state of an Active DRX, and the terminal device can also receive and decode the PDCCH during the activation state of the Active DRX; the measuring, by a terminal device, a first signal received by each of at least one downlink receiving beam and transmitted by a network device includes: starting, by the terminal device, the first measurement timer, and measuring, by the terminal device, the first signal received by a first downlink receiving beam; if the first measurement timer does not expire, continuing, by the terminal device, measuring the first signal received by a second downlink receiving beam; and if the first measurement timer expires, stopping, by the terminal device, the measurement.

It should be understood that the number of the at least one downlink receiving beam measured by the terminal device within a duration of the first measurement timer may also be greater than or equal to the number of downlink receiving beams formed by the terminal device and the network device by means of beamforming. For example, the duration of the first measurement timer is sufficient for the terminal device to measure all the downlink receiving beams formed by the network device and the terminal device by means of beamforming. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

It should be also understood that the first downlink receiving beam and the second downlink receiving beam are both downlink receiving beams formed by the terminal device and the network device by means of beamforming, and the first downlink receiving beam is different from the second downlink receiving beam.

It should also be understood that the length of the first measurement timer should satisfy that the terminal device can select the target downlink receiving beam, and the terminal device can also successfully receive and decode the PDCCH during the activation state of the Active DRX.

Specifically, the terminal device may set the first measurement timer, where the length of the first measurement timer is less than the duration in which the terminal device is in the activation state of the Active DRX, and the terminal device can also receive and decode the PDCCH during the activation state of the Active DRX, and the terminal device starts the first measurement timer, and sequentially measures the first signal received by each of downlink receiving beams formed by the terminal device and the network device by means of beamforming, and checks whether the first measurement timer expires each time measurement on the first signal received by a downlink receiving beam is performed. If the first measurement timer does not expire, the terminal device continues measuring the first signal received by other downlink receiving beams, if the first measurement timer expires, the terminal device stops the measurement.

In an embodiment, the terminal device may set the first measurement timer according to an indication of the network device, or the terminal device may set the first measurement timer by itself, which is not limited in the embodiments of the present application.

In an embodiment, the terminal may determine a historical average duration of the target downlink receiving beam as the duration of the first measurement timer, which is not limited in the embodiments of the present application.

The data transmission method for discontinuous reception provided by the present application, through setting the first measurement timer by the terminal device, and sequentially measuring the first signal received by the downlink receiving beam formed by the terminal device and the network device by means of beamforming within the duration of the first measurement timer, where the length of the first measurement timer is less than the duration in which the terminal device is in the activation state of the Active DRX, may reduce the time required for the terminal device to select the downlink receiving beam, thereby ensuring that the terminal device can successfully receive and decode the PDCCH transmitted by the network device during the activation state of the Active DRX.

In combination with the third possible implementation of the first aspect, in a fourth possible implementation of the first aspect, the determining, by the terminal device, the first measurement timer includes: receiving, by the terminal device, second indication information transmitted by the network device, where the second indication information is configured to indicate a measurement duration, and the measurement duration is less than the duration in which the terminal device is in the activation state of the Active DRX, and the terminal device can receive and decode the PDCCH during the activation state of the Active DRX; and determining, by the terminal device, the first measurement timer according to the measurement duration.

Specifically, the terminal device may set the first measurement timer according to an indication of the network device.

In an embodiment, the terminal device may receive the second indication information transmitted by the network device, where the second indication information is configured to indicate the measurement duration, and the terminal device sets the first measurement timer according to the measurement duration.

In an embodiment, the network device may determine a historical average duration of the target downlink receiving beam determined by the terminal device as the duration of the first measurement timer, which is not limited in the embodiments of the present application.

In combination with the third or fourth possible implementation of the first aspect, in a fifth possible implementation of the first aspect, the duration in which the terminal device is in the activation state of the Active DRX is a length of a duration timer On-duration Timer of the terminal device.

In combination with the first aspect, in a sixth possible implementation of the first aspect, before the measuring, by the terminal device, a first signal received by each of at least one downlink receiving beam and transmitted by a network device, the method further includes: determining, by the terminal device, a signal strength threshold, where the signal strength threshold is not less than a minimum signal strength value required for enabling the terminal device to receive and decode the PDCCH; the measuring, by the terminal device, a first signal received by each of at least one downlink receiving beam and transmitted by a network device includes: measuring, by the terminal device, the first signal received by a first downlink receiving beam to obtain a first signal strength; if the first signal strength is less than the signal strength threshold, continuing, by the terminal device, measuring the first signal received by a second downlink receiving beam.

It should be understood that the number of the at least one downlink receiving beam measured by the terminal device may also be greater than or equal to the number of downlink receiving beams formed by the terminal device and the network device by means of beamforming. For example, if the signal strength threshold is set to be relative high, it is possible to measure that only the signal strength of the first signal received by the last one downlink receiving beam just satisfies the signal strength threshold. However, the embodiments of the present application only take a case where the number of the at least one downlink receiving beam measured by the terminal device is less than the number of downlink receiving beams formed by the terminal device and the network device by means of beamforming until the downlink receiving beam that satisfies the signal strength threshold is measured as an example to describe each of the embodiments of the present application, but the embodiments of the present application is not limited thereto.

Specifically, the terminal device may set one signal strength threshold, the signal strength threshold is not less than a minimum signal strength value required for enabling the terminal device to receive and decode the PDCCH, and the terminal device may sequentially measure the signal strength of the first signal received by each of the downlink receiving beams formed by the terminal device and the network device by means of beamforming, and each time the signal strength of the first signal received by one downlink receiving beam is measured, determine the size relationship between the signal strength and the signal strength threshold. If the signal strength is less than the signal strength threshold, the terminal device continues measuring other downlink receiving beams, the terminal device stops measuring the other downlink receiving beams until the downlink receiving beam whose signal strength is greater than or equal to the signal strength threshold is detected, and determines the downlink receiving beam as the target downlink receiving beam.

The data transmission method for discontinuous reception provided by the present application, through setting the signal strength threshold by the terminal device, and as long as a downlink receiving beam that satisfies the signal strength threshold is detected by the terminal device, determining the downlink receiving beam as the target downlink receiving beam, may reduce the time required for the terminal device to select the downlink receiving beam, thereby ensuring that the terminal device can successfully receive and decode the PDCCH transmitted by the network device during the activation state of the Active DRX.

In an embodiment, the terminal device may set the signal strength threshold by itself, or the terminal device may set the signal strength threshold according to an indication of the network device, which is not limited in the embodiments of the present application.

In an embodiment, the terminal device may determine a minimum signal strength value required for enabling the terminal device to receive and decode the PDCCH as the signal strength threshold, or the terminal device may determine a signal strength that is greater than the minimum signal strength value as the signal strength threshold, which is not limited in the embodiments of the present application.

In an embodiment, the network device may determine a historical average signal strength which enables terminal device to the measure to obtain the target downlink receiving beam, and receive and decode the PDCCH as the signal strength threshold, which is not limited in the embodiments of the present application.

In combination with any of the above possible implementations of the above aspect, the determining, by the terminal device, a target downlink receiving beam from the at least one downlink receiving beam according to a result of the measurement may be that the terminal device determines a downlink receiving beam having a strongest signal strength among signal strengths of the first signals received by each of the at least one downlink receiving beam as the target downlink receiving beam.

In combination with the sixth possible implementation of the first aspect, in a seventh possible implementation of the first aspect, before the measuring, by a terminal device, a first signal received by each of at least one downlink receiving beam and transmitted by a network device, the method further includes: starting, by the terminal device, a second measurement timer, where a length of the second measurement timer is less than a duration in which the terminal device is in an activation state of an Active DRX, and the terminal device can also receive and decode the PDCCH during the activation state of the Active DRX; the if the first signal strength is less than the signal strength threshold, continuing, by the terminal device, measuring the first signal received by the second downlink receiving beam includes: if the first signal strength is less than the signal strength threshold, and the second measurement timer does not expire, continuing, by the terminal device, measuring the first signal received by the second downlink receiving beam.

Specifically, the terminal device may set and start the second measurement timer, where the length of the second measurement timer is less than the duration in which the terminal device is in the activation state of the Active DRX, and the terminal device can also receive and decode the PDCCH during the activation state of the Active DRX. The terminal device can sequentially measure the first signal received by the downlink receiving beam formed by the terminal device and the network device by means of beamforming as long as within the duration of the second measurement timer, until a downlink receiving beam that satisfies the signal strength threshold condition is detected.

In combination with the sixth possible implementation of the first aspect, in an eighth possible implementation of the first aspect, before the measuring, by a terminal device, a first signal received by each of at least one downlink receiving beam and transmitted by a network device, the method further includes: determining, by the terminal device, the number of the at least one downlink receiving beam, where the number of the at least one downlink receiving beam is less than the number of the downlink receiving beams formed by the terminal device and the network device by means of beamforming; the if the first signal strength is less than the signal strength threshold, continuing, by the terminal device, measuring the first signal received by the second downlink receiving beam includes: if the first signal strength is less than the signal strength threshold, and a number of downlink receiving beams that have been measured by the terminal device is less than the number of the at least one downlink receiving beam, continuing, by the terminal device, measuring the first signal received by the second downlink receiving beam.

Specifically, the terminal device may set the number of the at least one downlink receiving beam, where the number of the at least one downlink receiving beam is less than the number of downlink receiving beams formed by the terminal device and the network device by means of beamforming, the number of the downlink receiving beams measured by the terminal device does not exceed the number of the at least one downlink receiving beam determined by the terminal device, and the terminal device may sequentially measure the first signal received by the downlink receiving beam formed by the terminal device and the network device by means of beamforming until the downlink receiving beam that satisfies the signal strength threshold condition is detected.

In combination with any one of the sixth to the eighth possible implementations of the first aspect, in a ninth possible implementation of the first aspect, the method further includes: if the first signal strength is greater than or equal to the signal strength threshold, stopping, by the terminal device, the measurement; and the determining, by the terminal device, the target downlink receiving beam from the at least one downlink receiving beam according to a result of the measurement includes: determining, by the terminal device, the first downlink receiving beam as the target downlink receiving beam.

Specifically, as long as the terminal device detects that the signal strength of the first signal received by one downlink receiving beam satisfies the signal strength threshold, then no matter whether the second measurement timer expires or not, and whether each of the at least one downlink receiving beam is measured, the terminal device determines the downlink receiving beam as the target downlink receiving beam.

In combination with any one of the sixth to the ninth possible implementations of the first aspect, in a tenth possible implementation of the first aspect, the determining, by the terminal device, a signal strength threshold includes: receiving, by the terminal device, third indication information transmitted by the network device, where the third indication information is configured to indicate a minimum signal strength value required for enabling the terminal device to receive and decode the PDCCH; and determining, by the terminal device, the signal strength threshold according to the minimum signal strength value.

Specifically, the terminal device may determine the signal strength threshold according to an indication of the network device.

In an embodiment, the terminal device may receive the third indication information transmitted by the network device, where the third indication information is configured to indicate that the minimum signal strength value required for enabling the terminal device to receive and decode the PDCCH, and the terminal device may determine the signal strength threshold according to the minimum signal strength value.

The data transmission method for discontinuous reception provided by the embodiment of the present application may reduce the time required for the terminal device to select the downlink receiving beam, thereby ensuring that the terminal device can successfully receive and decode the PDCCH transmitted by the network device during the activation state of the Active DRX.

In a second aspect, the present application provides a data transmission method for discontinuous reception, where the data transmission method includes:

transmitting, by a network device, a first signal for measurement and indication information to a terminal device, where the indication information is configured to instruct the terminal device to determine a target downlink receiving beam from at least one downlink receiving beam by measuring the first signal;

receiving, by the network device, the target downlink receiving beam reported by the terminal device according to the first signal and the indication information; and transmitting, by the network device, a physical downlink control channel PDCCH to the terminal device through the target downlink receiving beam.

In an embodiment, a number of the at least one downlink receiving beam may be less than a number of downlink receiving beams formed by the terminal device and the network device by means of beamforming.

It should be understood that the number of the at least one downlink receiving beam may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In the data transmission method for discontinuous reception provided by the present application, through transmitting, by the network device, to the terminal device, the first signal for measurement and the indication information for instructing the terminal device to determine the target downlink receiving beam from the at least one downlink receiving beam, where the number of the at least one downlink receiving beam is less than the number of the downlink receiving beams formed by the network device and the terminal device by means of beamforming, may reduce a time required for the terminal device to select the downlink receiving beam, so that the terminal device can successfully receive and decode the PDCCH transmitted by the network device during the activation state of the Active DRX.

In combination with the second aspect, in a first possible implementation of the second aspect, the indication information includes first indication information, the first indication information is configured to indicate the number of the at least one downlink receiving beam, and the number of the at least one downlink receiving beam is less than the number of the downlink receiving beams formed by the terminal device and the network device by means of beamforming.

It should be understood that the first signal transmitted by the network device is used for the terminal device to select the target downlink receiving signal from all downlink receiving beams, and the first signal may be, for example, a downlink reference signal, a primary synchronization signal (Primary Synchronization Signal, PSS), a secondary synchronization signal (Secondary Synchronization Signal, SSS) or other signals for measurement, which is not limited in the embodiments of the present application.

It should also be understood that the number of the at least one downlink receiving beam may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

The data transmission method for discontinuous reception provided by the present application, through transmitting, to the terminal device, indication information for indicating the number of the at least one downlink reception beam, which is a part of downlink receiving beams formed by the terminal device and the network device by means of beamforming, so that the terminal device determines the target downlink receiving beam by measuring the first signal received by each of the at least one downlink receiving beam, may reduce the time required for the terminal device to select the downlink receiving beam, thereby ensuring that the terminal device can successfully receive and decode the PDCCH transmitted by the network device during the activation state of the Active DRX.

In combination with the second aspect, or the first possible implementation of the second aspect, in a second possible implementation of the second aspect, the indication information further includes second indication information, where the second indication information is configured to indicate a measurement duration, and the measurement duration is less than a duration in which the terminal device is in the activation state of the Active DRX, and the terminal device can receive and decode the PDCCH during the activation state of the Active DRX.

It should be understood that the number of the at least one downlink receiving beam measured by the terminal device within a duration of the first measurement timer may also be greater than or equal to the number of downlink receiving beams formed by the terminal device and the network device by means of beamforming. For example, the duration of the first measurement timer is sufficient for the terminal device to measure all the downlink receiving beams formed by the network device and the terminal device by means of beamforming. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In an embodiment, the network device may determine a historical average duration of the target downlink receiving beam determined by the terminal device as the duration of the first measurement timer, which is not limited in the embodiments of the present application.

The data transmission method for discontinuous reception provided by the present application, through transmitting, by the network device, to the terminal device, the indication information for indicating the measurement duration so that the terminal device determines the first measurement timer according to the measurement duration, and sequentially measure the first signal received by the downlink receiving beam formed by the terminal device and the network device by means of beamforming within the duration of the first measurement timer, where the length of the first measurement timer is less than a duration in which the terminal device is in the activation state of the Active DRX, may reduce the time required for the terminal device to select the downlink receiving beam, thereby ensuring that the terminal device can successfully receive and decode the PDCCH transmitted by the network device during the activation state of the Active DRX.

In combination with the second possible implementation of the second aspect, in a third possible implementation of the second aspect, a duration in which the terminal device is in the activation state of the Active DRX is a length of a duration timer On-duration Timer of the terminal device.

In combination with the second aspect, any one of the first to the third possible implementations of the second aspect, in a fourth possible implementation of the second aspect, the indication information further includes third indication information, the third indication information is configured to indicate a minimum signal strength value required for enabling the terminal device to receive and decode the PDCCH.

It should be understood that the number of the at least one downlink receiving beam measured by the terminal device may also be greater than or equal to the number of downlink receiving beams formed by the terminal device and the network device by means of beamforming. For example, if the signal strength threshold is set to be relative high, it is possible to measure that only the signal strength of the first signal received by the last one downlink receiving beam just satisfies the signal strength threshold. However, the embodiments of the present application only take a case where the number of the at least one downlink receiving beam measured by the terminal device is less than the number of downlink receiving beams formed by the terminal device and the network device by means of beamforming until the downlink receiving beam that satisfies the signal strength threshold is measured as an example to describe each of the embodiments of the present application, but the embodiments of the present application is not limited thereto.

In an embodiment, the network device may determine a historical average signal strength which enables terminal device to measure to obtain the target downlink receiving beam, and receive and decode the PDCCH as the signal strength threshold, which is not limited in the embodiments of the present application.

In an embodiment, the indication information transmitted by the network device in the embodiment of the present application may include at least one of the first indication information, the second indication information and the third indication information, which is not limited by the embodiment of the present application.

The data transmission method for discontinuous reception provided by the present application, through transmitting, by the network device, to the terminal device, indication information for indicating the minimum signal strength value required for enabling the terminal device to receive and decode the PDCCH so that the terminal device determines the signal strength threshold according to the minimum signal strength value, so that as long as the terminal device detects a downlink receiving beam whose signal strength of the received first signal is greater than the signal strength threshold, it can determine the downlink receiving beam as the target downlink receiving beam, may reduce the time required for the terminal device to select the downlink receiving beam, thereby ensuring that the terminal device can successfully receive and decode the PDCCH transmitted by the network device during the activation state of the Active DRX.

In a third aspect, the present application provides a data transmission apparatus for discontinuous reception for performing the data transmission method in the above first aspect or any possible implementation of the first aspect. In particular, the data transmission apparatus includes units for performing the data transmission method in the above first aspect or any possible implementations of the first aspect.

In a fourth aspect, the present application provides a data transmission apparatus for discontinuous reception for performing the data transmission method in the above second aspect or any possible implementation of the second aspect. In particular, the data transmission apparatus includes units for performing the data transmission method in the above second aspect or any possible implementations of the second aspect.

In a fifth aspect, the present application provides a data transmission apparatus for discontinuous reception, including: a memory and a processor, the memory is configured to store an instruction, the processor is configured to execute the instruction stored by the memory, and when the processor executes the instructions stored by the memory, the execution causes the processor to perform the data transmission method in the above first aspect or any possible implementations of the first aspect.

In a sixth aspect, the present application provides a data transmission apparatus for discontinuous reception, including: a memory and a processor, the memory is configured to store an instruction, the processor is configured to execute the instruction stored by the memory, and when the processor executes the instructions stored by the memory, the execution causes the processor to perform the data transmission method in the above second aspect or any possible implementations of the second aspect.

In a seventh aspect, the present application provides a computer readable medium for storing a computer program, the computer program including instructions for performing the data transmission method in the above first aspect or any possible implementations of the first aspect.

In an eighth aspect, the present application provides a computer readable medium for storing a computer program, the computer program including instructions for performing the data transmission method in the above second aspect or any possible implementations of the second aspect.

BRIEF DESCRIPTION OF DRAWINGS

FIG. 1 is a schematic structural diagram of a wireless communication system to which an embodiment of the present application is applied.

FIG. 2 is a schematic flowchart of a signal transmission method for discontinuous reception according to an embodiment of the present application.

FIG. 3 is a schematic flowchart of another signal transmission method for discontinuous reception according to an embodiment of the present application.

FIG. 4 is a schematic block diagram of a signal transmission apparatus for discontinuous reception according to an embodiment of the present application.

DESCRIPTION OF EMBODIMENTS

Figure 5:
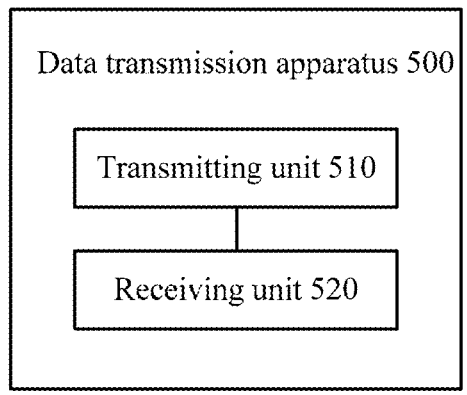
FIG. 5 is a schematic block diagram of another signal transmission apparatus for discontinuous reception according to an embodiment of the present application.

The technical solutions in the embodiments of the present application will be described below with reference to the accompanying drawings in the embodiments of the present application.

The technical solution of the embodiment of the present application may be applied to various communication systems, such as a global system of mobile communication (GSM) system, a code division multiple access (CDMA) system, a wideband code division multiple access (WCDMA) system, a general packet radio service (GPRS), a long term evolution (LTE) System, a LTE frequency division duplex (FDD) system, a LTE time division duplex (TDD), a universal mobile telecommunication system (UMTS), a worldwide interoperability for microwave access (WiMAX) communication system, a future evaluated public land mobile network (PLMN) or a 5G system in the further.

In an embodiment, the 5G system or network may also be referred to as a new radio (NR) system or network.

FIG. 1 shows a wireless communication system 100 to which an embodiment of the present application is applied. The wireless communication system 100 may include at least one network device 110. Network device 100 may be a device that communicates with a terminal device. Each network device 100 may provide communication coverage for a particular geographic area and may communicate with terminal devices (e.g., UEs) located within the coverage area. The network device 100 may be a base station (Base Transceiver Station, "BTS" for short) in a GSM system or a CDMA system, or a base station (NodeB, "NB" for short) in a WCDMA system, or may be an evolutional base station (Evolutional Node B, "eNB" or "eNodeB" for short) in an LTE system, or a wireless controller in a cloud radio access network (CRAN), or the network device may a relay station, an access point, an in-vehicle device, a wearable device, a network side device in a future 5G network, or a network device in a future evolved PLMN, or the like.

The wireless communication system 100 further includes a plurality of terminal devices 120 located within the coverage of the network device 110. The terminal device 120 may be mobile or fixed. The terminal device 120 may be referred to as an access terminal, a user equipment (UE), a user unit, a user station, a mobile station, a mobile platform, a remote station, a remote terminal, a mobile device, and a user terminal, a terminal, a wireless communication device, a user agent or a user apparatus. The access terminal may be a cellular phone, a cordless phone, a session initiation protocol (SIP) phone, a wireless local loop (WLL) station, or a personal digital assistant (PDA), or a handheld device with wireless communication capabilities, computing device or other processing device connected to a wireless modem, a vehicle-mounted device, a wearable device, a terminal device in a future 5G network, or a terminal device in a future evolved PLMN, or the like.

FIG. 1 exemplarily shows one network device and two terminal devices. In an embodiment, the wireless communication system 100 may include a plurality of network devices, and other numbers of terminal devices may be included within coverage of each network device, but the embodiments of the present application is not limited thereto.

In an embodiment, the wireless communication system 100 may further include other network entities, such as a network controller, a mobility management entity, or the like, but the embodiments of the present application is not limited thereto.

The following is a description of the discontinuous reception (DRX) technology involved in the embodiments of the present application.

Packet-based data streams are usually bursty, and when there is no data transmission, a power consumption can be reduced by turning off a receiving circuitry of the terminal device, thereby increasing battery using time. This is an origin of DRX, that is, DRX technology refers to stopping monitoring a PDCCH channel for a period of time. There are two types of DRX: one is DRX in RRC_IDLE, as the name implies, that is, a discontinuous reception when the terminal device is in an idle IDLE state, because under the IDLE state, there is no radio resource control (RRC) connection and user's dedicated resources, so it is mainly to monitor a calling channel and a broadcast channel, as long as a fixed period is predefined, the purpose of discontinuous reception can be achieved, but if the terminal device intends to monitor to a user data channel, it must firstly enter a connected CONNECTED state from the IDLE state; the other is DRX in RRC_CONNECTED, that is, a discontinuous reception when the terminal device is in a RRC connection state, and by causing the terminal device to periodically enter a sleep period and stop monitoring the PDCCH, the system resource configuration can be optimized, and more importantly, power can be saved without causing the terminal device to enter the IDLE state to achieve this purpose, for example, some non-real-time applications, such as web browsing, instant messaging, or the like, always exist for a period of time, a mobile phone does not need to ceaselessly monitor downlink data and related processing, then DRX technology can be applied to such a situation.

DRX in RRC_CONNECTED can also be referred as Active DRX. The Active DRX mechanism allows the terminal device to periodically transform between the sleep state and the activation state while maintaining an RRC connection. The Active DRX mechanism divides the connected state of the terminal device into an activation state phase and a sleep state phase. When the terminal device is in the activation state, a receiving antenna of the terminal device is enabled, so that the terminal device can receive a downlink data packet, and the power consumption of the terminal device is relative high. When the terminal device is in the sleep state, the receiving antenna of the terminal device is disenabled, the terminal device cannot receive the downlink data packet, then the terminal device is in a power saving mode, but a context of the RRC connection still remains.

The signal transmission method and apparatus for discontinuous reception provided by the embodiments of the present application can reduce a time required for the terminal equipment to select a downlink receiving beam during the activation state of the Active DRX, so that the terminal device can successfully decode the downlink receiving beam and receive the PDCCH transmitted by the network device through the downlink receiving beam during the activation state of the Active DRX.

FIG. 2 shows a schematic flowchart of a data transmission method for discontinuous reception 200 provided by an embodiment of the present application. As shown in FIG. 2, the data transmission method 200 includes:

S210, a terminal device measures a first signal received by each of at least one downlink receiving beam and transmitted by a network device, where a number of the at least one downlink receiving beam is less than a number of downlink receiving beams formed by the terminal device and the network device by means of beamforming;

S220, the terminal device determines a target downlink receiving beam from the at least one downlink receiving beam according to a result of the measurement;

S230, the terminal device reports the target downlink receiving beam to the network device, S240, the terminal device receives, through the target downlink receiving beam, a physical downlink control channel PDCCH transmitted by the network device.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

It should be further understood that the downlink receiving beam of the terminal device in the embodiments of the present application may also be a downlink receiving signal or a downlink channel, which is not limited in the embodiments of the present application.

It should be further understood that the first signal transmitted by the network device is used for the terminal device to select the target downlink receiving signal from all downlink receiving beams, and the first signal may be, for example, a downlink reference signal, a primary synchronization signal (Primary Synchronization Signal, PSS), a secondary synchronization signal (Secondary Synchronization Signal, SSS) or other signals for measurement, which is not limited in the embodiments of the present application.

The data transmission method for discontinuous reception provided by the embodiments of the present application, through performing measurement on a part of downlink receiving beam selected from a plurality of downlink receiving beams formed by the terminal device and the network device by means of beamforming, reduces the number of the downlink receiving beam required to be measured by the terminal device, thereby reducing the time required for the terminal device to perform beam selection, and ensuring that the terminal device can successfully receive and decode the PDCCH transmitted by the network device during the activation state of the Active DRX.

In an embodiment, before S210, the terminal device may determine the at least one downlink receiving beam.

Specifically, the terminal device determining the at least one downlink receiving beam may be that the terminal device selects the at least one downlink receiving beam from downlink receiving beams formed by the terminal device and the network device by means of beamforming, and measures the first signal received by each of the at least one downlink receiving beam and transmitted by the network device.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In an embodiment, the terminal device may determine the at least one downlink receiving beam by itself, or may determine the at least one downlink receiving beam according to an indication of the network device, which is not limited in the embodiments of the present application.

As an optional embodiment, the terminal device may determine downlink receiving beams in different directions in spatial as the at least one downlink receiving beam.

As another optional embodiment, the terminal device may receive first indication information transmitted by the network device, where the first indication information is configured to indicate the number of the at least one downlink receiving beam, and the terminal device may determine the at least one downlink receiving beam according to the number of the at least one downlink receiving beam.

In an embodiment, before S210, the terminal device may set a first measurement timer, where a length of the first measurement timer is less than a duration in which the terminal device is in an activation state of an Active DRX, and the terminal device can also receive and decode the PDCCH during the activation state of the Active DRX.

It should be understood that the number of the at least one downlink receiving beam measured by the terminal device within a duration of the first measurement timer may also be greater than or equal to the number of downlink receiving beams formed by the terminal device and the network device by means of beamforming. For example, the duration of the first measurement timer is sufficient for the terminal device to measure all the downlink receiving beams formed by the network device and the terminal device by means of beamforming. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

It should also be understood that the length of the first measurement timer should satisfy that the terminal device can select the target downlink receiving beam, and the terminal device can also successfully receive and decode the PDCCH during the activation state of the Active DRX.

It should also be understood that the duration in which the terminal device is in the activation state of the Active DRX may be a length of a duration timer On-duration Timer of the terminal device.

In an embodiment, the terminal device may set the first measurement timer according to an indication of the network device, or the terminal device may set the first measurement timer by itself, which is not limited in the embodiments of the present application.

As an optional embodiment, the terminal may determine a historical average duration of the target downlink receiving beam as the duration of the first measurement timer.

As another optional embodiment, the terminal device may receive second indication information transmitted by the network device, where the second indication information is configured to indicate the measurement duration, and the terminal device determines the first measurement timer according to the measurement duration.

Specifically, in S210, a terminal device measuring a first signal received by each of at least one downlink receiving beam and transmitted by a network device may be that the terminal device starts the first measurement timer, and measures the first signal received by a first downlink receiving beam, if the first measurement timer does not expire, the terminal device continues measuring the first signal received by a second downlink receiving beam, and if the first measurement timer expires, the terminal device stop the measurement.

That is, a terminal device measuring a first signal received by each of at least one downlink receiving beam and transmitted by a network device may be that the terminal device starts the first measurement timer, and sequentially measures the first signal received by each of downlink receiving beams formed by the terminal device and the network device by means of beamforming, and checks whether the first measurement timer expires each time measurement of the first signal received by a downlink receiving beam is performed. If the first measurement timer does not expire, the terminal device continues measuring the first signal received by other downlink receiving beams, if the first measurement timer expires, stopping the measurement.

It should be understood that the first downlink receiving beam and the second downlink receiving beam are both downlink receiving beams formed by the terminal device and the network device by means of beamforming, and the first downlink receiving beam is different from the second downlink receiving beam.

The data transmission method for discontinuous reception provided by the embodiments of the present application, through setting the first measurement timer by the terminal device, and sequentially measuring the first signal received by the downlink receiving beam formed by the terminal device and the network device by means of beamforming within the duration of the first measurement timer, where the length of the first measurement timer is less than the duration in which the terminal device is in the activation state of the Active DRX, may reduce the time required for the terminal device to select the downlink receiving beam, thereby ensuring that the terminal device can successfully receive and decode the PDCCH transmitted by the network device during the activation state of the Active DRX.

In an embodiment, before S210, the terminal device may determine a signal strength threshold, where the signal strength threshold is not less than a minimum signal strength value required for enabling the terminal device to receive and decode the PDCCH.

It should be understood that the number of the at least one downlink receiving beam measured by the terminal device may also be greater than or equal to the number of downlink receiving beams formed by the terminal device and the network device by means of beamforming. For example, if the signal strength threshold is set to be relative high, it is possible to measure that only the signal strength of the first signal received by the last one downlink receiving beam just satisfies the signal strength threshold. However, the embodiments of the present application only take a case where the number of the at least one downlink receiving beam measured by the terminal device is less than the number of downlink receiving beams formed by the terminal device and the network device by means of beamforming until the downlink receiving beam that satisfies the signal strength threshold is measured the downlink receiving beam as an example to describe each of the embodiments of the present application, but the embodiments of the present application is not limited thereto.

It should be understood that the signal strength threshold may be larger than or equal to the minimum signal strength value.

In an embodiment, the terminal device may set the signal strength threshold by itself, or the terminal device may set the signal strength threshold according to an indication of the network device, which is not limited in the embodiments of the present application.

In an embodiment, the network device may determine a historical average signal strength which enables terminal device to the measure to obtain the target downlink receiving beam, and receive and decode the PDCCH as the signal strength threshold, which is not limited in the embodiments of the present application.

In an embodiment, the terminal device may receive the third indication information transmitted by the network device, where the third indication information is configured to indicate that the minimum signal strength value required for enabling the terminal device to receive and decode the PDCCH, and the terminal device may determine the signal strength threshold according to the minimum signal strength value.

Specifically, in S210, a terminal device measuring a first signal received by each of at least one downlink receiving beam and transmitted by a network device may be that the terminal device measures the first signal received by the first downlink receiving beam to obtain the first signal strength; if the first signal strength is less than the signal strength threshold, the terminal device continues measuring the first signal received by the second downlink receiving beam.

That is, a terminal device measuring a first signal received by each of at least one downlink receiving beam and transmitted by a network device may be that the terminal device sequentially measures the signal strength of the first signal received by each of the downlink receiving beams formed by the terminal device and the network device by means of beamforming, and each time the signal strength of the first signal received by one downlink receiving beam is measured, determine whether the signal strength satisfies a signal strength threshold condition. If the signal strength does not satisfy the signal strength threshold condition, the terminal device continues measuring other downlink receiving beams.

The data transmission method for discontinuous reception provided by the embodiments of the present application, through setting the signal strength threshold by the terminal device, and as long as a downlink receiving beam that satisfies the signal strength threshold is detected by the terminal device, determining the downlink receiving beam as the target downlink receiving beam, may reduce the time required for the terminal device to select the downlink receiving beam, thereby ensuring that the terminal device can successfully receive and decode the PDCCH transmitted by the network device during the activation state of the Active DRX.

In an embodiment, before S210, the terminal device may further determine the signal strength threshold, and start a second measurement timer, where a length of the second measurement timer is less than a duration in which the terminal device is in an activation state of an Active DRX, and the terminal device can receive and decode the PDCCH during the activation state of the Active DRX.

Specifically, in S210, if the first signal strength is less than the signal strength threshold, the terminal device continuing measuring the first signal received by the second downlink receiving beam may be that if the first signal strength is less than the signal strength threshold, and the second measurement timer does not expire, the terminal device continues measuring the first signal received by the second downlink receiving beam.

That is, the terminal device may set and start the second measurement timer, where the length of the second measurement timer is less than the duration in which the terminal device is in the activation state of the Active DRX, and the terminal device can receive and decode the PDCCH during the activation state of the Active DRX. The terminal device can sequentially measure the first signal received by the downlink receiving beam formed by the terminal device and the network device by means of beamforming as long as within the duration of the second measurement timer, until a downlink receiving beam that satisfies the condition is detected.

In an embodiment, before S210, the terminal device may further determine the number of the at least one downlink receiving beam, where the number of the at least one downlink receiving beam is less than the number of the downlink receiving beams formed by the terminal device and the network device by means of beamforming.

Specifically, in S210, if the first signal strength is less than the signal strength threshold, the terminal device continuing measuring the first signal received by the second downlink receiving beam may be that if the first signal strength is less than the signal strength threshold, and the number of downlink receiving beams that have been measured by the terminal device is less than the number of the at least one downlink receiving beam, the terminal device continues measuring the first signal received by the second downlink receiving beam.

That is, the terminal device may set the number of the at least one downlink receiving beam, where the number of the at least one downlink receiving beam is less than the number of downlink receiving beams formed by the terminal device and the network device by means of beamforming, the number of the downlink receiving beams measured by the terminal device does not exceed the number of the at least one downlink receiving beam determined by the terminal device, and the terminal device may sequentially measure the first signal received by the downlink receiving beam formed by the terminal device and the network device by means of beamforming until the downlink receiving beam that satisfies the condition is detected.

Specifically, in S220, the terminal device determining a target downlink receiving beam from the at least one downlink receiving beam according to a result of the measurement may be that the terminal device determines a downlink receiving beam having a strongest signal strength among signal strengths of the first signals received by each of the at least one downlink receiving beam as the target downlink receiving beam.

In an embodiment, in S210, if the first signal strength is greater than or equal to the signal strength threshold, the terminal device stops the measurement; and the terminal device determining a target downlink receiving beam from the at least one downlink receiving beam according to a result of the measurement may be that the terminal device determines the first downlink receiving beam as the target downlink receiving beam.

It should be understood that the terminal device measuring the first signal received by a downlink receiving beam may be measuring a signal strength or a signal quality of the first signal received by the downlink receiving beam, which is not limited by the embodiments of the present application.

That is, as long as the terminal device detects that the signal strength of the first signal received by one downlink receiving beam satisfies the signal strength threshold, then no matter whether the second measurement timer expires or not, and whether each of the at least one downlink receiving beam is measured, the terminal device determines the downlink receiving beam as the target downlink receiving beam.

It should be understood that the size of the sequence numbers of the above each of the processes do not imply an execution order. The execution order of each of the processes should be determined by their functions and internal logic, but is not intended to limit an implementation in the embodiments of the present application.

FIG. 3 is a schematic flowchart of another data transmission method for discontinuous reception 300 provided by an embodiment of the present application. As shown in FIG. 3, the method 300 includes:

S310, a network device transmits a first signal for measurement and indication information to a terminal device, the indication information is configured to instruct the terminal device to determine a target downlink receiving beam from at least one downlink receiving beam by measuring the first signal, where the number of the at least one downlink receiving beam is less than the number of downlink receiving beams formed by the network device and the terminal device by means of beamforming;

S320, the network device receives the target downlink receiving beam reported by the terminal device according to the first signal and the indication information;

S330, the network device transmits a physical downlink control channel PDCCH to the terminal device through the target downlink receiving beam.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In the data transmission method for discontinuous reception provided by the embodiments of the present application, through transmitting, by the network device, to the terminal device, the first signal for measurement and the indication information for instructing the terminal device to determine the target downlink receiving beam from the at least one downlink receiving beam, where the number of the at least one downlink receiving beam is less than the number of the downlink receiving beams formed by the network device and the terminal device by means of beamforming, may reduce a time required for the terminal device to select the downlink receiving beam, so that the terminal device can successfully receive and decode the PDCCH transmitted by the network device during the activation state of the Active DRX.

It should be understood that the first signal transmitted by the network device is used for the terminal device to select the target downlink receiving signal from all downlink receiving beams, and the first signal may be, for example, a downlink reference signal, a primary synchronization signal (PSS), a secondary synchronization signal (SSS) or other signals for measurement, which is not limited in the embodiments of the present application.

In an embodiment, the indication information transmitted by the network device to the terminal device may include first indication information, the first indication information is configured to indicate the number of the at least one downlink receiving beam, and the number of the at least one downlink receiving beam is less than the number of the downlink receiving beams formed by the terminal device and the network device by means of beamforming.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

The data transmission method for discontinuous reception provided by the embodiments of the present application, through transmitting, to the terminal device, indication information for indicating the number of the at least one downlink reception beam, which is a part of downlink receiving beams formed by the terminal device and the network device by means of beamforming, so that the terminal device determines the target downlink receiving beam by measuring the first signal received by each of the at least one downlink receiving beam, may reduce the time required for the terminal device to select the downlink receiving beam, thereby ensuring that the terminal device can successfully receive and decode the PDCCH transmitted by the network device during the activation state of the Active DRX.

In an embodiment, the indication information transmitted by the network device to the terminal device may further include second indication information, where the second indication information is configured to indicate a measurement duration, and the measurement duration is less than the duration in which the terminal device is in the activation state of the Active DRX, and the terminal device can also receive and decode the PDCCH during the activation state of the Active DRX.

It should be understood that the number of the at least one downlink receiving beam measured by the terminal device within a duration of the first measurement timer may also be greater than or equal to the number of downlink receiving beams formed by the terminal device and the network device by means of beamforming. For example, the duration of the first measurement timer is sufficient for the terminal device to measure all the downlink receiving beams formed by the network device and the terminal device by means of beamforming. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In an embodiment, the network device may determine a historical average duration of the target downlink receiving beam determined by the terminal device as the duration of the first measurement timer, which is not limited in the embodiments of the present application.

The data transmission method for discontinuous reception provided by the present application, through transmitting, by the network device, to the terminal device, the indication information for indicating the measurement duration so that the terminal device determines the first measurement timer according to the measurement duration, and sequentially measure the first signal received by the downlink receiving beam formed by the terminal device and the network device by means of beamforming within the duration of the first measurement timer, where the length of the first measurement timer is less than the duration in which the terminal device is in the activation state of the Active DRX, may reduce the time required for the terminal device to select the downlink receiving beam, thereby ensuring that the terminal device can successfully receive and decode the PDCCH transmitted by the network device during the activation state of the Active DRX.

It should be understood that the duration in which the terminal device is in the activation state of the Active DRX is a length of a duration timer On-duration Timer of the terminal device.

In an embodiment, the indication information transmitted by the network device to the terminal device may further include third indication information, the third indication information is configured to indicate a minimum signal strength value required for enabling the terminal device to receive and decode the PDCCH.

It should be understood that the number of the at least one downlink receiving beam measured by the terminal device may also be greater than or equal to the number of downlink receiving beams formed by the terminal device and the network device by means of beamforming. For example, if the signal strength threshold is set to be relative high, it is possible to measure that only the signal strength of the first signal received by the last one downlink receiving beam just satisfies the signal strength threshold. However, the embodiments of the present application only take a case where the number of the at least one downlink receiving beam measured by the terminal device is less than the number of downlink receiving beams formed by the terminal device and the network device by means of beamforming until the downlink receiving beam that satisfies the signal strength threshold is measured the downlink receiving beam as an example to describe each of the embodiments of the present application, but the embodiments of the present application is not limited thereto.

In an embodiment, the network device may determine a historical average signal strength which enables terminal device to measure to obtain the target downlink receiving beam, and receive and decode the PDCCH as the signal strength threshold, which is not limited in the embodiments of the present application.

The data transmission method for discontinuous reception provided by the embodiments of the present application, through transmitting, by the network device, to the terminal device, the indication information for indicating the minimum signal strength value required for enabling the terminal device to receive and decode the PDCCH so that the terminal device determines the signal strength threshold according to the minimum signal strength value, so that as long as the terminal device detects a downlink receiving beam whose signal strength of the received first signal is greater than the signal strength threshold, it can determine the downlink receiving beam as the target downlink receiving beam, may reduce the time required for the terminal device to select the downlink receiving beam, thereby ensuring that the terminal device can successfully receive and decode the PDCCH transmitted by the network device during the activation state of the Active DRX.

In an embodiment, the indication information transmitted by the network device in the embodiments of the present application may include at least one of the first indication information, the second indication information and the third indication information, so that the terminal device determines the target downlink receiving beam according to the indication information, which is not limited by the embodiments of the present application.

It should be understood that the size of sequence numbers of the above each of the processes do not imply an execution order. The execution order of each of the processes should be determined by their functions and internal logic, but is not intended to limit an implementation in the embodiments of the present application.

The data transmission method for discontinuous reception according to the embodiments of the present application are described in detail above in combination with FIG. 1 to FIG. 3, and the data transmission apparatus for discontinuous reception according to the embodiments of the present application will be described in detail below in combination with FIG. 4 to FIG. 7.

FIG. 4 shows a data transmission apparatus 400 for discontinuous reception provided by an embodiment of the present application. The data transmission apparatus 400 includes:

a measuring unit 410, configured to measure a first signal received by each of at least one downlink receiving beam and transmitted by a network device, where a number of the at least one downlink receiving beam is less than a number of downlink receiving beams formed by a terminal device and the network device by means of beamforming;

a determining unit 420, configured to determine a target downlink receiving beam from the at least one downlink receiving beam according to a result of the measurement measured by the measuring unit 410;

a transmitting unit 430 is configured to report the target downlink receiving beam determined by the determining unit 420 to the network device; and a receiving unit 440 is configured to receive, through the target downlink receiving beam determined by the determining unit 420, a physical downlink control channel PDCCH transmitted by the network device.

In an embodiment, the number of the at least one downlink receiving beam may be less than the number of downlink receiving beams formed by the terminal device and the network device by means of beamforming.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiments of the present application is not limited thereto.

In an embodiment, the determining unit is further configured to: before a first signal received by each of at least one downlink receiving beam and transmitted by a network device is measured, determine the at least one downlink receiving beam.

In an embodiment, the determining unit is specifically configured to: receive first indication information transmitted by the network device, where the first indication information is configured to indicate the number of the at least one downlink receiving beam, and the number of the at least one downlink receiving beam is less than the number of the downlink receiving beams formed by the terminal device and the network device by means of beamforming; and determine the at least one downlink receiving beam according to the number of the at least one downlink receiving beam.

In an embodiment, the data transmission apparatus further includes a timing unit, where the timing unit is configured to, before a first signal received by each of at least one downlink receiving beam and transmitted by a network device is measured, determine a first measurement timer, where a length of the first measurement timer is less than a duration in which the terminal device is in an activation state of an Active DRX, and the terminal device can also receive and decode the PDCCH during the activation state of the Active DRX; start the first measurement timer; the measuring unit is specifically configured to: measure the first signal received by a first downlink receiving beam; if the first measurement timer does not expire, continue measuring the first signal received by a second downlink receiving beam; and if the first measurement timer expires, stop the measurement.

In an embodiment, the determining unit is configured to: receive second indication information transmitted by the network device, where the second indication information is configured to indicate a measurement duration, and the measurement duration is less than the duration in which the terminal device is in the activation state of the Active DRX; and determine the first measurement timer according to the measurement duration.

In an embodiment, the duration in which the terminal device is in the activation state of the Active DRX is a length of a duration timer On-duration Timer of the terminal device.

In an embodiment, the determining unit is further configured to: before a first signal received by each of at least one downlink receiving beam and transmitted by a network device is measured, determine a signal strength threshold, where the signal strength threshold is not less than a minimum signal strength value required for enabling the terminal device to receive and decode the PDCCH; the measuring unit is specifically configured to: measure the first signal received by a first downlink receiving beam to obtain a first signal strength; if the first signal strength is less than the signal strength threshold, continue measuring the first signal received by a second downlink receiving beam.

In an embodiment, the data transmission apparatus further includes a timing unit, where the timing unit is configured to: before a first signal received by each of at least one downlink receiving beam and transmitted by a network device is measured, start a second measurement timer, where a length of the second measurement timer is less than a duration in which the terminal device is in an activation state of an Active DRX, and the terminal device can also receive and decode the PDCCH during the activation state of the Active DRX; the measuring unit is specifically configured to: if the first signal strength is less than the signal strength threshold, and the second measurement timer does not expire, continue measuring the first signal received by the second downlink receiving beam.

In an embodiment, the determining unit is further configured to: before a first signal received by each of at least one downlink receiving beam and transmitted by a network device is measured, determine the number of the at least one downlink receiving beam, where the number of the at least one downlink receiving beam is less than the number of the downlink receiving beams formed by the terminal device and the network device by means of beamforming; the measuring unit is specifically configured to: if the first signal strength is less than the signal strength threshold, and the number of downlink receiving beams that have been measured by the terminal device is less than the number of the at least one downlink receiving beam, continue measuring the first signal received by the second downlink receiving beam.

In an embodiment, the measuring unit is further configured to stop the measurement if the first signal strength is greater than or equal to the signal strength threshold; the determining unit is specifically configured to determine the first downlink receiving beam as the target downlink receiving beam.

In an embodiment, the determining unit is specifically configured to: receive third indication information transmitted by the network device, where the third indication information is configured to indicate a minimum signal strength value required for enabling the terminal device to receive and decode the PDCCH; and determine the signal strength threshold according to the minimum signal strength value.

In an optional example, those skilled in the art may understand that the data transmission apparatus 400 may be specifically the terminal device in the above method 200, and the data transmission apparatus 400 may be configured to execute each of the processes and/or steps in the above method 200 corresponding to the terminal device. To avoid repetition, details will not be described herein.

FIG. 5 shows another data transmission apparatus 500 for discontinuous reception provided by an embodiment of the present application. The data transmission apparatus 500 includes:

a transmitting unit 510, configured to transmitting a first signal for measurement and indication information to a terminal device, where the indication information is configured to instruct the terminal device to determine a target downlink receiving beam from at least one downlink receiving beam by measuring the first signal, wherein the number of the at least one downlink receiving beam is less than the number of downlink receiving beams formed by the network device and the terminal device by means of beamforming;

a receiving unit 520, configured to receive the target downlink receiving beam reported by the terminal device according to the first signal and the indication information transmitted by the transmitting unit 510;

the transmitting unit 510 is further configured to transmit a physical downlink control channel PDCCH to the terminal device through the target downlink receiving beam received by the receiving unit 520.

In an embodiment, the number of the at least one downlink receiving beam may be less than the number of the downlink receiving beams formed by the terminal device and the network device by means of beamforming.

It should be understood that the number of the at least one downlink receiving beam measured by the terminal device may also be larger than or equal to the number of downlink receiving beams formed by the terminal device and the network device by means of beamforming. For example, during an activation state of an Active DRX, after the terminal device measures all the downlink receiving beams formed by the terminal device and the network device by means of beamforming, and determines the target downlink receiving beam, there is still enough time to receive and decode the PDCCH. However the embodiments of the present application only take a case where the number of the at least one downlink receiving beam is less than the number of downlink receiving beams formed by the terminal device and the network device by means of beamforming as an example to describe each of the embodiments of the present application, but the embodiment of the present application is not limited thereto.

In an embodiment, the indication information may include first indication information, where the first indication information is configured to indicate the number of the at least one downlink receiving beam, and the number of the at least one downlink receiving beam is less than the number of the downlink receiving beams formed by the terminal device and the network device by means of beamforming.

In an embodiment, the indication information may further include second indication information, the second indication information is configured to indicate a measurement duration, and the measurement duration is less than the duration in which the terminal device is in an activation state of an Active DRX, and the terminal device can also receive and decode the PDCCH during the activation state of the Active DRX.

In an embodiment, the duration in which the terminal device is in the activation state of the Active DRX is a length of a duration timer On-duration Timer of the terminal device.

In an embodiment, the indication information may further include third indication information, the third indication information is configured to indicate a minimum signal strength value required for enabling the terminal device to receive and decode the PDCCH.

In an embodiment, the indication information transmitted by the network device in the embodiments of the present application may include at least one of the first indication information, the second indication information and the third indication information, which is not limited by the embodiments of the present application.

In an optional example, those skilled in the art may understand that the data transmission apparatus 500 may be specifically the network device in the above method 300, and the data transmission apparatus 500 may be configured to execute each of the processes and/or steps in the above method 300 corresponding to the network device. To avoid repetition, details will not be described herein.

It should be understood that the data transmission apparatus 400 and the data transmission apparatus 500 herein may be embodied in the form of functional units. The term "unit" herein may refer to an application specific integrated circuit (Application Specific Integrated Circuit, ASIC), an electronic circuit, a processor for executing one or more software or firmware programs (for example, a shared processor, a proprietary processor, or a group processor, or the like) and memory, merge logic, and/or other suitable components that support the functions described.

Figure 6:
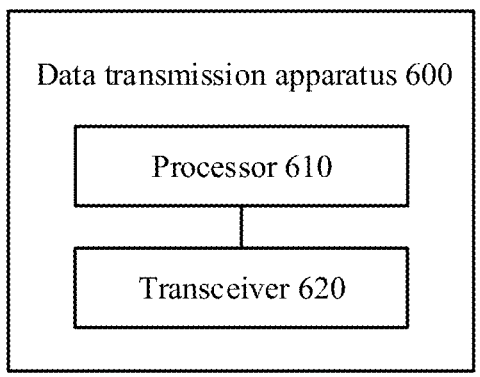
FIG. 6 is a schematic block diagram of still another signal transmission apparatus for discontinuous reception according to an embodiment of the present application.

FIG. 6 is a schematic block diagram of a data transmission apparatus 600 according to an embodiment of the present application. As shown in FIG. 6, the data transmission apparatus 600 includes a processor 610 and a transceiver 620.

The processor 610 is specifically configured to measure a first signal received by each of at least one downlink receiving beam and transmitted by a network device, where a number of the at least one downlink receiving beam is less than a number of downlink receiving beams formed by the terminal device and the network device by means of beamforming; and determine a target downlink receiving beam from the at least one downlink receiving beam according to a result of the measurement.

The transceiver 620 is specifically configured to report the target downlink receiving beam to the network device, and receive, through the target downlink receiving beam, a physical downlink control channel PDCCH transmitted by the network device.

In an optional example, those skilled in the art may understand that the data transmission apparatus 600 may be specifically the terminal device in the above method 200, and the data transmission apparatus 600 may be configured to execute each of the processes and/or steps in the above method 200 corresponding to the terminal device. To avoid repetition, details will not be described herein.

In an embodiment, the data transmission apparatus 600 may also include a memory, which may include a read only memory and a random access memory, and provides instructions and data to the processor. A part of the memory may also include a non-volatile random access memory. For example, the memory can also store information about device type. The processor 610 may be configured to execute instructions stored in the memory, and when the processor executes the instructions, the processor may perform each of the steps in the above method embodiment corresponding to the terminal device.

Figure 7:
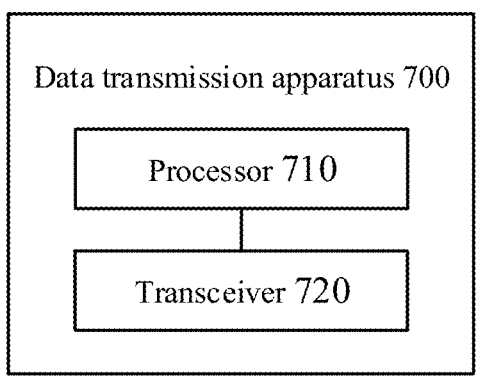
FIG. 7 is a schematic block diagram of still another signal transmission apparatus for discontinuous reception according to an embodiment of the present application.

FIG. 7 is a schematic block diagram of a data transmission apparatus 700 according to an embodiment of the present application. As shown in FIG. 7, the data transmission apparatus 700 includes a processor 710 and a transceiver 720.

The processor 710 is configured to determine to transmit a first signal for measurement and indication information to a terminal device.

The transceiver 720 is configured to transmit the first signal for measurement and the indication information to the terminal device, where the indication information is configured to instruct the terminal device to determine a target downlink receiving beam from at least one downlink receiving beam by measuring the first signal, wherein the number of the at least one downlink receiving beam is less than the number of downlink receiving beams formed by the network device and the terminal device by means of beamforming; and receive the target downlink receiving beam reported by the terminal device according to the first signal and the indication information;

the transceiver 720 is further configured to transmit a physical downlink control channel PDCCH to the terminal device through the target downlink receiving beam.

In an optional example, those skilled in the art may understand that the data transmission apparatus 700 may be specifically the network device in the above method 300, and the data transmission apparatus 700 may be configured to execute each of the processes and/or steps in the above method 300 corresponding to the network device. To avoid repetition, details will not be described herein.

In an embodiment, the data transmission apparatus 700 may also include a memory, which may include a read only memory and a random access memory, and provides instructions and data to the processor. A part of the memory may also include a non-volatile random access memory. For example, the memory can also store information about device type. The processor 710 may be configured to execute instructions stored in the memory, and when the processor executes the instructions, the processor may perform each of the steps in the above method embodiment corresponding to the network device.

It should be understood that, in the embodiments of the present application, the processor may be a central processing unit (CPU), and the processor may also be other general-purpose processors, digital signal processors (DSP), application specific integrated circuits (ASIC), field programmable gate array (FPGA) or other programmable logic devices, discrete gates or transistor logic devices, discrete hardware components, or the like. The general-purpose processor may be a microprocessor or the processor may also be any conventional processors, or the like.

In the process of implementation, each of the steps in the above methods may be completed by an integrated logic circuit of hardware or instructions in a form of software in a processor. The steps in combination with the method disclosed in the embodiments of the present application may be directly implemented by a hardware processor, or may be performed by a combination of hardware and software in the processor. The software module may be located in a mature storage medium in the art, such as a random memory, a flash memory, a read only memory, a programmable read only memory or an electrically erasable programmable memory, a register, or the like. The storage medium is located in the memory, and the processor reads instructions in the memory and combines the hardware to complete the steps of the above methods. To avoid repetition, details will not be described herein.

It should be understood that the term such as "and/or" herein is merely an association relationship describing associated objects, which indicates that there may be three relationships, for example, A and/or B may indicate presence of A only, of both A and B, and of B only. In addition, the character "/" herein generally indicates that contextual objects have an "or" relationship.

It should be understood that, in various embodiments of the present application, the size of the sequence numbers of the above each of processes do not imply an execution order. The execution order of each of the processes should be determined by their functions and internal logic, but is not intended to limit an implementation in the embodiments of the present application.

It may be known to persons of ordinary skill in the art that, the units and the algorithm steps of each example that are described in combination with the embodiments disclosed herein may be implemented by electronic hardware or a combination of computer software and electronic hardware. The situation whether these functions are performed by hardware or software depends on specific applications and design constraints of the technical solution. Persons of ordinary skill in the art may implement the described functions by using different methods for each specific application, but such implementation should not be regarded as going beyond the scope of the present application.

It may be clearly understood by persons of ordinary skill in the art that, for the purpose of convenient and brief description, reference may be made to the corresponding process in the above method embodiments for detailed working processes of the above described systems, apparatuses, and units, and details will not be described herein again.

In several embodiments provided by the present application, it should be understood that the disclosed systems, apparatuses, and methods may be implemented in other manners. For example, the above described apparatus embodiments are merely exemplary. For instance, the division of the units is merely a division of logical functions and there may be other divisions approach during actual implementations. For instance, multiple units or components may be combined or integrated into another system, or some features may be omitted or not performed. In addition, the displayed or discussed mutual couplings or direct couplings or communication connections may be through indirect couplings or communication connections between some interfaces, the apparatuses or units, which may be in electronic, mechanical, or other forms.

The units described as separate parts may or may not be physically separate, and the parts displayed as units may or may not be physical units, that is, may be located in one location, or may be distributed on multiple network units. A part or all of the units may be selected according to actual needs to achieve the purpose of the scheme in each of the embodiments of the present application.

In addition, each of functional units in the embodiments of the present application may be integrated into one processing unit, or each of the units may exist alone physically, or two or more units are integrated into one unit.

If the described functions implemented in a form of a software functional unit and sold or used as an independent product, it may be stored in a computer-readable storage medium. Based on such an understanding, the technical solution of the present application essentially, or the part contributing to the prior art, or a part of the technical solution may be implemented in a form of a software product. The computer software product is stored in a storage medium, and includes several instructions for enabling a computer device (which may be a personal computer, a server, or a network device, or the like) to perform all or a part of the steps of the methods described in the embodiments of the present application. And the above described storage medium includes: any mediums that can store program codes, such as a USB flash disk, a mobile hard disk, a read-only memory (ROM), a random access memory (RAM), a magnetic disk, or an optical disc, or the like.

The above descriptions are merely specific implementations of the present application; however, the protection scope of the present application is not limited thereto. Any modification or replacement that may be readily thought by persons of ordinary skill in the art within the technical scope disclosed in the present application should fall into the protection scope of the present application. Thus, the protection scope of the present application shall be subject to the protection scope of the claims.

What is claimed is:

1. A data transmission method for discontinuous reception, comprising:
    measuring, by a terminal device, a first signal received by each of at least one downlink receiving beam and transmitted by a network device, wherein a number of the at least one downlink receiving beam is less than a number of downlink receiving beams formed by the terminal device and the network device by means of beamforming;
    determining, by the terminal device, a target downlink receiving beam from the at least one downlink receiving beam according to a result of the measurement;
    reporting, by the terminal device, the target downlink receiving beam to the network device, and receiving, by the terminal device, through the target downlink receiving beam, a physical downlink control channel (PDCCH) transmitted by the network device;
    wherein before the measuring, by a terminal device, a first signal received by each of at least one downlink receiving beam and transmitted by a network device, the method further comprises:
    determining, by the terminal device, a signal strength threshold, wherein the signal strength threshold is not less than a minimum signal strength value required for enabling the terminal device to receive and decode the PDCCH;
    the measuring, by a terminal device, a first signal received by each of at least one downlink receiving beam and transmitted by a network device comprises:
    measuring, by the terminal device, the first signal received by a first downlink receiving beam to obtain a first signal strength;
    starting, by the terminal device, a second measurement timer, wherein a length of the second measurement timer is less than a duration in which the terminal device is in an activation state of an Active DRX, and the terminal device also receive and decode the PDCCH during the activation state of the Active DRX;
    when the first signal strength is less than the signal strength threshold, and the second measurement timer does not expire, continuing, by the terminal device, measuring the first signal received by a second downlink receiving beam.

2. The data transmission method according to claim 1, wherein before the measuring, by a terminal device, a first signal received by each of at least one downlink receiving beam and transmitted by a network device, the method further comprises:
    determining, by the terminal device, the at least one downlink receiving beam.

3. The data transmission method according to claim 2, wherein the determining, by the terminal device, the at least one downlink receiving beam comprises:

receiving, by the terminal device, first indication information transmitted by the network device, wherein the first indication information is configured to indicate the number of the at least one downlink receiving beam, and the number of the at least one downlink receiving beam is less than the number of the downlink receiving beams formed by the terminal device and the network device by means of beamforming; and determining, by the network device, the at least one downlink receiving beam according to the number of the at least one downlink receiving beam.

4. The data transmission method according to claim 1, wherein before the measuring, by a terminal device, a first signal received by each of at least one downlink receiving beam and transmitted by a network device, the method further comprises:

determining, by the terminal device, a first measurement timer, wherein a length of the first measurement timer is less than a duration in which the terminal device is in an activation state of an active discontinuous reception (Active DRX), and the terminal device also receive and decode the PDCCH during the activation state of the Active DRX, wherein the duration in which the terminal device is in the activation state of the Active DRX is a length of an on-duration timer of the terminal device;

the measuring, by a terminal device, a first signal received by each of at least one downlink receiving beam and transmitted by a network device comprises:

starting, by the terminal device, the first measurement timer, and measuring, by the terminal device, the first signal received by a first downlink receiving beam;

if the first measurement timer does not expire, continuing, by the terminal device, measuring the first signal received by a second downlink receiving beam; and if the first measurement timer expires, stopping, by the terminal device, the measurement.

5. The data transmission method according to claim 4, wherein the determining, by the terminal device, the first measurement timer comprises:

receiving, by the terminal device, second indication information transmitted by the network device, wherein the second indication information is configured to indicate a measurement duration, and the measurement duration is less than a duration in which the terminal device is in the activation state of the Active DRX; and determining, by the terminal device, the first measurement timer according to the measurement duration.

6. The data transmission method according to claim 1, wherein before the measuring, by a terminal device, a first signal received by each of at least one downlink receiving beam and transmitted by a network device, the method further comprises:

determining, by the terminal device, the number of the at least one downlink receiving beam, wherein the number of the at least one downlink receiving beam is less than the number of the downlink receiving beams formed by the terminal device and the network device by means of beamforming;

the if the first signal strength is less than the signal strength threshold, continuing, by the terminal device, measuring the first signal received by a second downlink receiving beam comprises:

if the first signal strength is less than the signal strength threshold, and a number of downlink receiving beams that have been measured by the terminal device is less than the number of the at least one downlink receiving beam, continuing, by the terminal device, measuring the first signal received by the second downlink receiving beam.

7. The data transmission method according to claim 1, wherein the method further comprises:

if the first signal strength is greater than or equal to the signal strength threshold, stopping, by the terminal device, the measurement;

the determining, by the terminal device, a target downlink receiving beam from the at least one downlink receiving beam according to a result of the measurement comprises:

determining, by the terminal device, the first downlink receiving beam as the target downlink receiving beam.

8. The data transmission method according to claim 1, wherein the determining, by the terminal device, a signal strength threshold comprises:

receiving, by the terminal device, third indication information transmitted by the network device, wherein the third indication information is configured to indicate a minimum signal strength value required for enabling the terminal device to receive and decode the PDCCH; and determining, by the terminal device, the signal strength threshold according to the minimum signal strength value.

9. A data transmission apparatus for discontinuous reception, comprising a processor and a memory storing instructions thereon, the processor when executing the instructions, being configured to:

measure a first signal received by each of at least one downlink receiving beam and transmitted by a network device, wherein a number of the at least one downlink receiving beam is less than a number of downlink receiving beams formed by a terminal device and the network device by means of beamforming;

determine a target downlink receiving beam from the at least one downlink receiving beam according to a result of the measurement;

report the target downlink receiving beam to the network device; and receive, through the target downlink receiving beam, a physical downlink control channel (PDCCH) transmitted by the network device;

wherein the processor is further configured to:

before a first signal received by each of at least one downlink receiving beam and transmitted by a network device is measured, determine a signal strength threshold, wherein the signal strength threshold is not less than a minimum signal strength value required for enabling the terminal device to receive and decode the PDCCH;

measure the first signal received by a first downlink receiving beam to obtain a first signal strength;

start a second measurement timer, wherein a length of the second measurement timer is less than a duration in which the terminal device is in an activation state of an Active DRX, and the terminal device also receive and decode the PDCCH during the activation state of the Active DRX;

when the first signal strength is less than the signal strength threshold, and the second measurement timer does not expire, continue measuring the first signal received by a second downlink receiving beam.

10. The data transmission apparatus according to claim 9, wherein the processor is further configured to:
- before a first signal received by each of the at least one downlink receiving beam and transmitted by a network device is measured,
- determine the at least one downlink receiving beam.

11. The data transmission apparatus according to claim 10, wherein the processor is further configured to:
- receive first indication information transmitted by the network device, wherein the first indication information is configured to indicate the number of the at least one downlink receiving beam, and the number of the at least one downlink receiving beam is less than the number of the downlink receiving beams formed by the terminal device and the network device by means of beamforming; and
- determine the at least one downlink receiving beam according to the number of the at least one downlink receiving beam.

12. The data transmission apparatus according to claim 9, wherein the processor is further configured to:
- before a first signal received by each of at least one downlink receiving beam and transmitted by a network device is measured, determine a first measurement timer, wherein a length of the first measurement timer is less than a duration in which the terminal device is in an activation state of an active discontinuous reception (Active DRX), and the terminal device also receive and decode the PDCCH during the activation state of the Active DRX, wherein the duration in which the terminal device is in the activation state of the Active DRX is a length of an on-duration timer of the terminal device; start the first measurement timer;
- measure the first signal received by a first downlink receiving beam;
- if the first measurement timer does not expire, continue measuring the first signal received by a second downlink receiving beam; and
- if the first measurement timer expires, stop the measurement.

13. The data transmission apparatus according to claim 12, wherein the processor is further configured to:
- receive second indication information transmitted by the network device, wherein the second indication information is configured to indicate a measurement duration, and the measurement duration is less than a duration in which the terminal device is in the activation state of the Active DRX; and
- determine the first measurement timer according to the measurement duration.

14. The data transmission apparatus according to claim 9, wherein the processor is further configured to:
- before a first signal received by each of at least one downlink receiving beam and transmitted by a network device is measured, determine the number of the at least one downlink receiving beam, wherein the number of the at least one downlink receiving beam is less than the number of the downlink receiving beams formed by the terminal device and the network device by means of beamforming;
- if the first signal strength is less than the signal strength threshold, and a number of downlink receiving beams that have been measured by the terminal device is less than the number of the at least one downlink receiving beam, continue measuring the first signal received by the second downlink receiving beam.

15. The data transmission apparatus according to claim 9, wherein the processor is further configured to:
- stop the measurement if the first signal strength is greater than or equal to the signal strength threshold;
- determine the first downlink receiving beam as the target downlink receiving beam.

16. The data transmission apparatus according to claim 9, wherein the processor is further configured to:
- receive third indication information transmitted by the network device, wherein the third indication information is configured to indicate a minimum signal strength value required for enabling the terminal device to receive and decode the PDCCH; and
- determine the signal strength threshold according to the minimum signal strength value.

\* \* \* \* \*